July 10, 1928.
J. J. JONES
LOCOMOTIVE VALVE GEAR
Filed Dec. 15, 1926
1,676,265
2 Sheets-Sheet 1
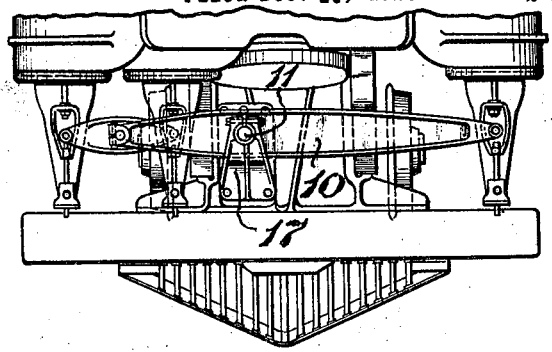
-FIG. 2.-
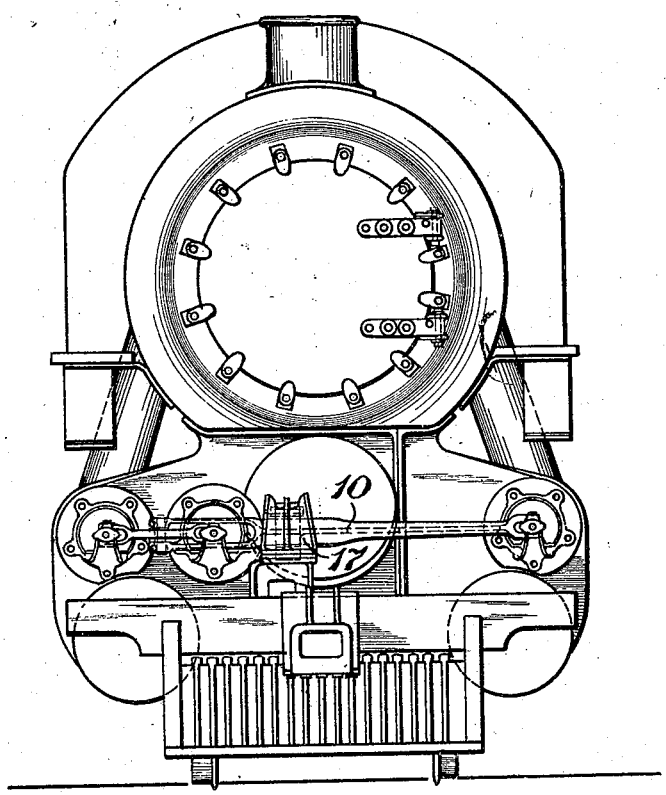
-FIG. 1.-

July 10, 1928.  1,676,265

J. J. JONES

LOCOMOTIVE VALVE GEAR

Filed Dec. 15, 1926  2 Sheets-Sheet 2

WITNESSES
A. S. Vanderbilt
S. R. Bell

INVENTOR
Joshua J. Jones
by Snowden Bell
Atty.

Patented July 10, 1928.

1,676,265

UNITED STATES PATENT OFFICE.

JOSHUA J. JONES, OF SCHENECTADY, NEW YORK.

LOCOMOTIVE VALVE GEAR.

Application filed December 15, 1926. Serial No. 154,883.

My invention more particularly relates to improved means for fastening the pivot pins of locomotive valve gears, and has for an object the provision of a simple, efficient, and inexpensive means for fastening the pivot pins of locomotive valve gears in operative position, said means permitting the ready removal of the pins, when required to effect renewals or repairs.

The improvement claimed is hereinafter fully set forth.

Figure 3:
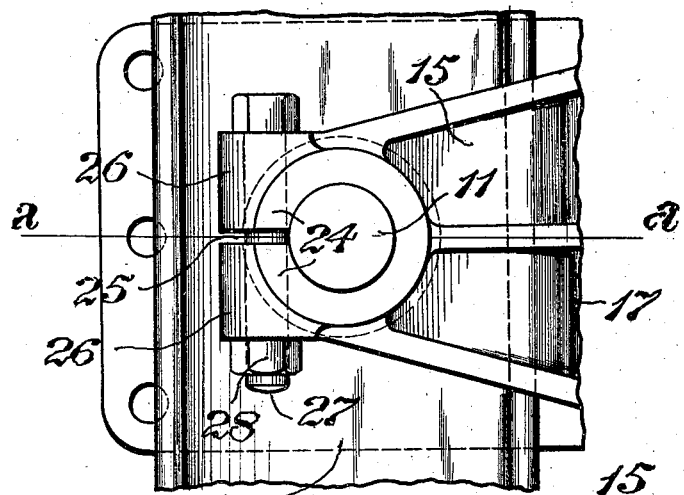
Figure 4:
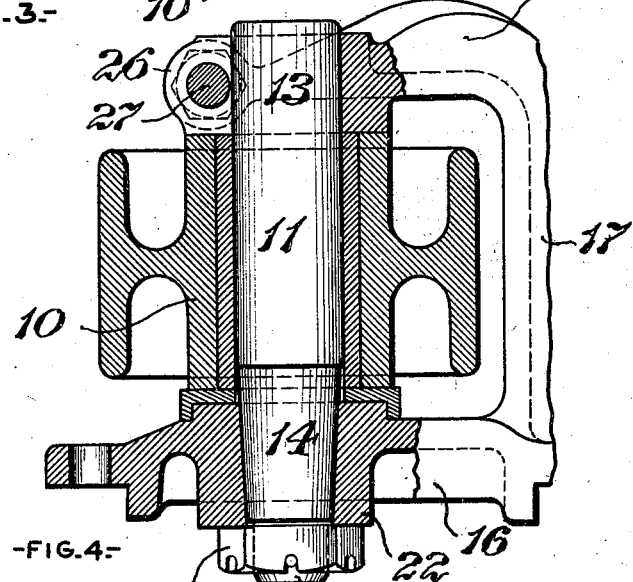

In the accompanying drawings: Figure 1, is a front view, in elevation, of a three cylinder locomotive equipped with a valve gear of the "Gresley" type, embodying my invention; Fig. 2, a plan view of the forward portion of the locomotive shown in Fig. 1; Fig. 3, a plan view of the mechanism at the rear end of the large motion lever yoke; Fig. 4, a vertical section on the line, a a of Fig. 3; and, Fig. 5, a plan view of the mechanism at the rear end of the large motion lever yoke, illustrating a structural modification.

In the practice of my invention, referring descriptively to the specific embodiment thereof which is herein exemplified, as applied in connection with the "Gresley" type of valve gear for three cylinder locomotives; the large motion lever, 10, is fulcrumed on a pivot pin, 11, which passes through a bore in the lever, and has its upper and lower end portions, 13 and 14, respectively, secured in bores in the upper and lower arms, 15 and 16, respectively, of the yoke 17. The lower end portion, 14, of the pin, is tapered to snugly fit the correspondingly tapered bore of the lower arm, 16, of the yoke. The pin is provided, below its tapered portion, with a threaded extension, 20, on which is fitted a castellated nut, 21, which bears on a boss, 22, formed on the under side of the lower arm. Screwing up the nut, acts to draw the tapered portion of the pin into snug engagement with the wall of the tapered bore.

In order to permit free insertion of the pivot pin through the bore in the upper arm of the yoke, the bore is made of slightly greater diameter than the pin. To provide for contracting the bore, to cause the wall thereof to firmly grip the upper end of the pin so as to prevent play and turning movements thereof, and consequent wear on the parts, the rear end of the upper arm of the yoke is split longitudinally, to provide two halves, 24, separated by an intervening space, 25. Each of the halves is provided, at its outer end, with a lug, 26. A bolt, 27, passes through suitable openings in the lugs, and carries a nut, 28, which, when tightened, draws the halves toward one another, producing the desired contraction of the bore in the upper arm.

In assembling the parts, the large motion lever, 10, is placed between the arms of the yoke, with its bore in axial alignment with the bores in the upper and lower arms, of the yoke. The pivot pin is then passed through the aligned bores, and the nut, 21, applied and tightened, whereby the tapered portion of the pivot pin will be drawn into snug engagement with the wall of the bore in the lower arm. The nut, 28, on the bolt, 27, is then tightened, to contract the wall of the bore in the upper arm, tightly around the upper end of the pin.

Figure 5:
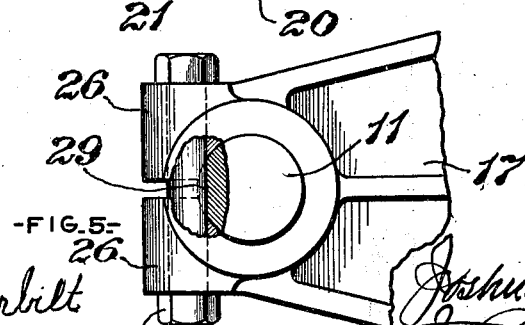

Fig. 5, illustrates a structural modification, wherein the upper end of the pivot pin is formed with a transverse recess, 29, and the bolt openings through the lugs, 26, are disposed so that the bolt, 27, will project into the recess, 29, and lock the pivot pin against vertical or turning movements.

It is within the contemplation of the invention to split both the upper and lower arms, and to provide a clamping bolt, 27, for each arm. It is also within the contemplation of the invention, to provide a transverse recess, 29, in both the upper and lower ends of the pivot pin, and to dispose the bolts, 27, so that they will project into the recesses.

By the phrase; "Vincent or Gresley type of valve gear", as used in the claims, I mean a valve gear for three cylinder locomotives, wherein the distribution valve of the center cylinder is actuated by the resultant of the movements of the distribution valve actuating mechanisms of the two outer cylinders.

I claim as my invention, and desire to secure by Letters Patent:

1. In a valve gear for locomotives, the combination of a yoke, having two spaced arms, each formed with a bore, one of the bores being tapered, one of the arms having spaced portions separated by a split extending into the bore, each of the spaced portions having a bolt opening; a member, having a bore disposed between the arms of the yoke; a pivot pin extending into the three bores, the portion of the pin extending into the tapered bore being tapered in correspondence therewith, said pin having a transverse recess; a bolt passing through the openings in the spaced portions of the split arm; and projecting into the recess in the pivot pin; and a nut threaded on the bolt, whereby the spaced portions of the split arm may be drawn toward one another to contract the bore thereof around the pin.

2. In a valve gear for locomotives, the combination of a yoke, having an upper and a lower arm, the upper arm being formed with a bore, and spaced portions separated by a split extending into the bore, each of the spaced portions having a bolt opening, the lower arm of the yoke being formed with a tapered bore; a member, having a bore disposed between the arms of the yoke, a pivot pin, extending into the three bores, the lower end thereof having a tapered portion fitted into the tapered bore of the lower arm, and a threaded portion extending below the tapered portion; a nut, threaded on the threaded portion of the pin and bearing on the lower arm, for holding the tapered portion of the pin in snug engagement with the wall of the tapered bore; a bolt, passing through the bolt openings in the spaced portions of the upper arm; and, a nut, threaded on the bolt, whereby the spaced portions may be drawn toward one another to contract the bore of the upper arm around the upper end of the pin.

3. In a valve gear for locomotives, the combination of a yoke having an upper and a lower arm, the upper arm being formed with a bore, and spaced portions separated by a split extending into the bore, each of the spaced portions having a bolt opening, the lower arm of the yoke being formed with a tapered bore; a member, having a bore disposed between the arms of the yoke; a pivot pin extending into the three bores, the upper end of the pin having a transverse recess and the lower end thereof having a tapered portion fitted into the tapered bore of the lower arm, and a threaded portion extending below the tapered portion; a nut threaded on the threaded portion of the pin, and bearing on the lower arm, for holding the tapered portion of the pin in snug engagement with the wall of the tapered bore; a bolt passing through the bolt openings in the spaced portions of the upper arm, and projecting into the recess in the upper end of the pin; and, a nut threaded on the bolt, whereby the spaced portions may be drawn toward one another to contract the bore of the upper arm around the upper end of the pin.

JOSHUA J. JONES.